5 Sheets—Sheet 1.

E. HORTON,

Assignor, by mesne assignments, to S. D. LOCKE.

Grain-Binder.

No. 8,787. Reissued July 8, 1879.

*WITNESSES:*

C. Clarence Poole

J. S. Post

*INVENTOR:*

E. Horton

By his attys

R. D. O. Smith

E. HORTON,

Assignor, by mesne assignments, to S. D. LOCKE.

Grain-Binder.

No. 8,787. Reissued July 8, 1879.

*WITNESSES:*

C. Clarence Poole

J. S. Post

*INVENTOR:*

E. Horton

By his attys

R. D. O. Smith

5 Sheets—Sheet 3.
E. HORTON,
Assignor, by mesne assignments, to S. D. LOCKE.
Grain-Binder.
No. 8,787. Reissued July 8, 1879.
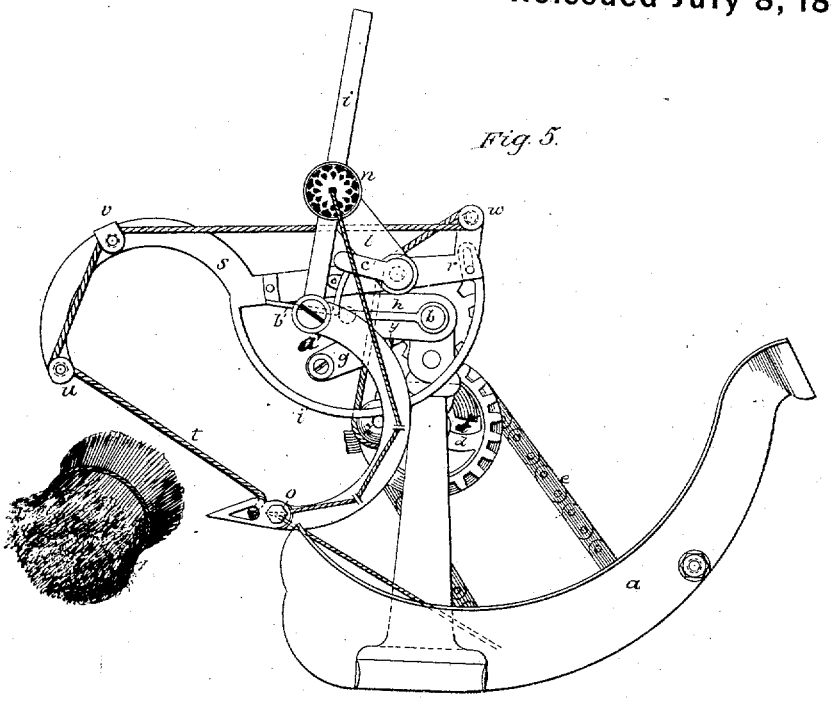
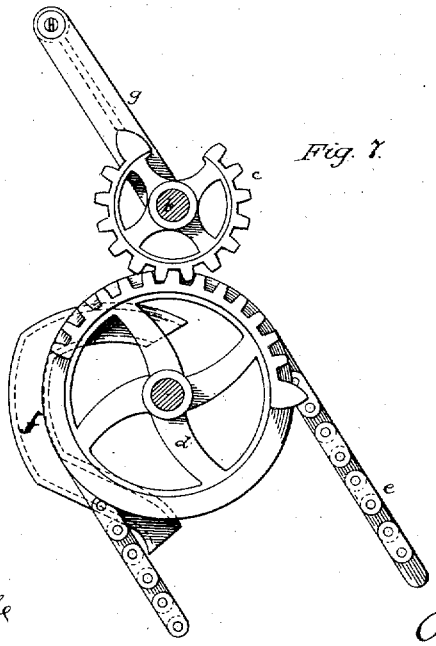
WITNESSES:
C. Clarence Poole
S. S. Lock
INVENTOR:
E. Horton
By his atty
R. A. Spurr 5 Sheets—Sheet 4.

E. HORTON,

Assignor, by mesne assignments, to S. D. LOCKE.

Grain-Binder.

No. 8,787. Reissued July 8, 1879.

WITNESSES:

C. Clarence Poole

S. S. Post

INVENTOR:

E. Horton

By his atty

R. D. Smith

E. HORTON,

Assignor, by mesne assignments, to S. D. LOCKE.

Grain-Binder.

No. 8,787. Reissued July 8, 1879.

*Witnesses:*

C. Clarence Poole

S. S. Dodge

*Inventor:*

E. Horton by his atty

R. D. O. Smith

UNITED STATES PATENT OFFICE.

EMMET HORTON, OF HARTFORD, CONNECTICUT, ASSIGNOR, BY MESNE ASSIGNMENTS, TO SYLVANUS D. LOCKE.

IMPROVEMENT IN GRAIN-BINDERS.

Specification forming part of Letters Patent No. 186,932, dated February 6, 1877; Reissue No. 8,787, dated July 8, 1879; application filed April 12, 1878.

*To all whom it may concern:*

Be it known that I, EMMET HORTON, of Hartford, in the county of Hartford and State of Connecticut, have invented certain new and useful Improvements pertaining to Grain-Binding Attachments for Harvesters, of which the following is a specification, reference being had to the accompanying drawings, where—

Figure 1:
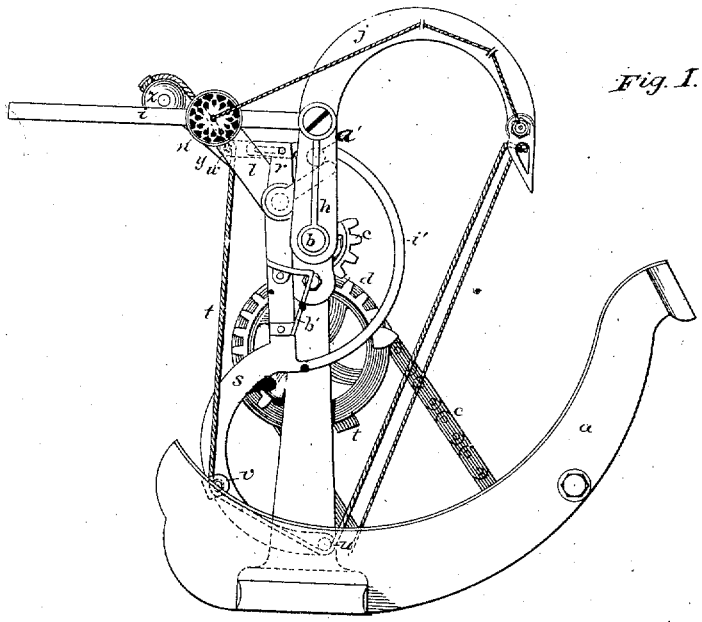
Figure 2:
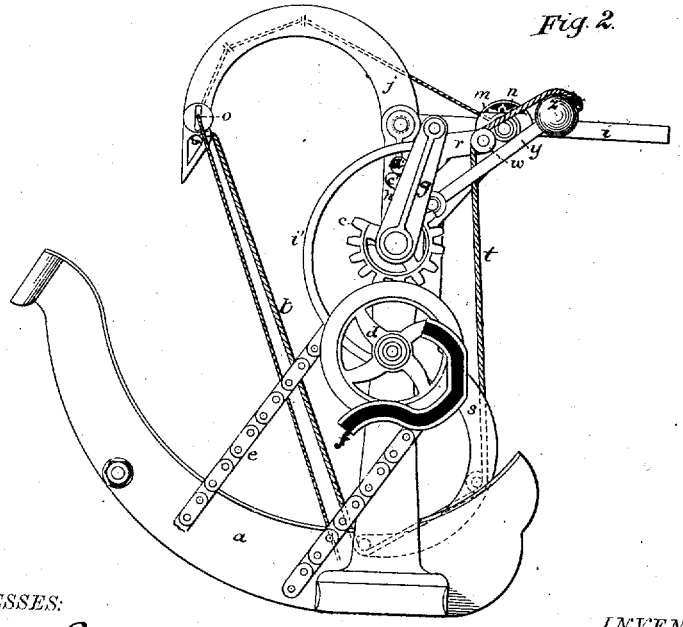
Figure 3:
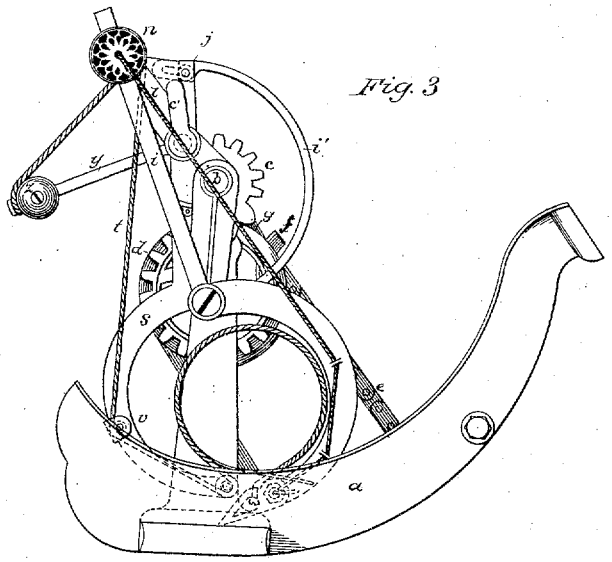
Figure 4:
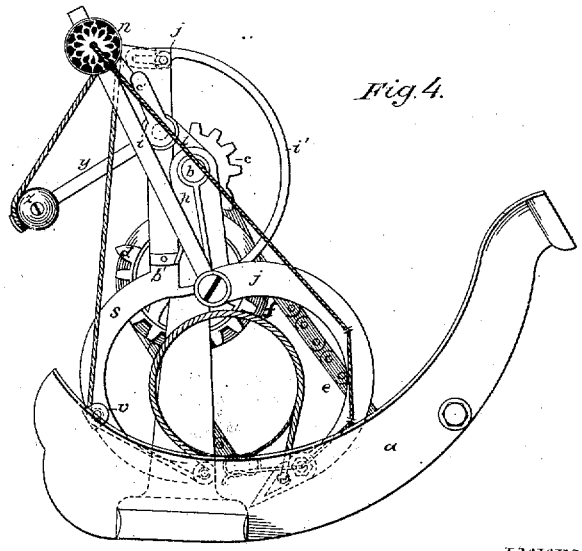
Figure 6:
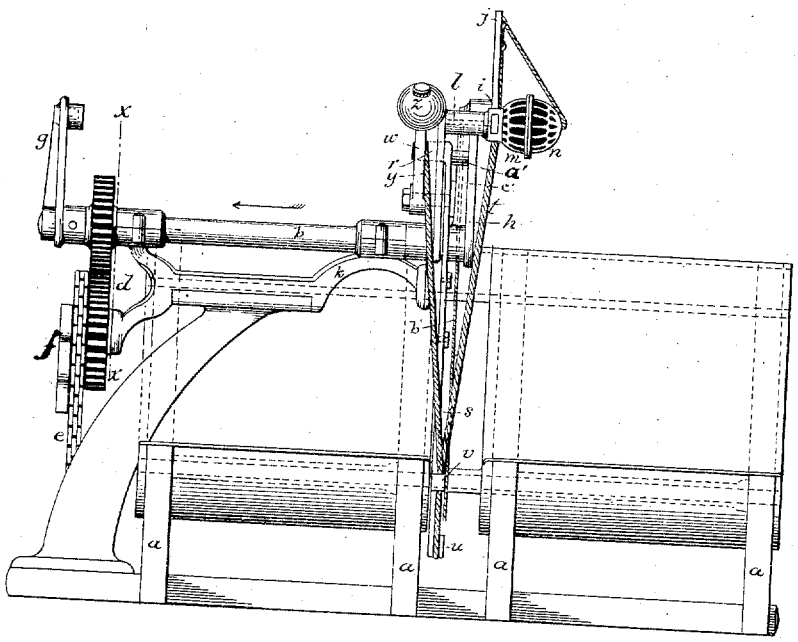
Figure 8:
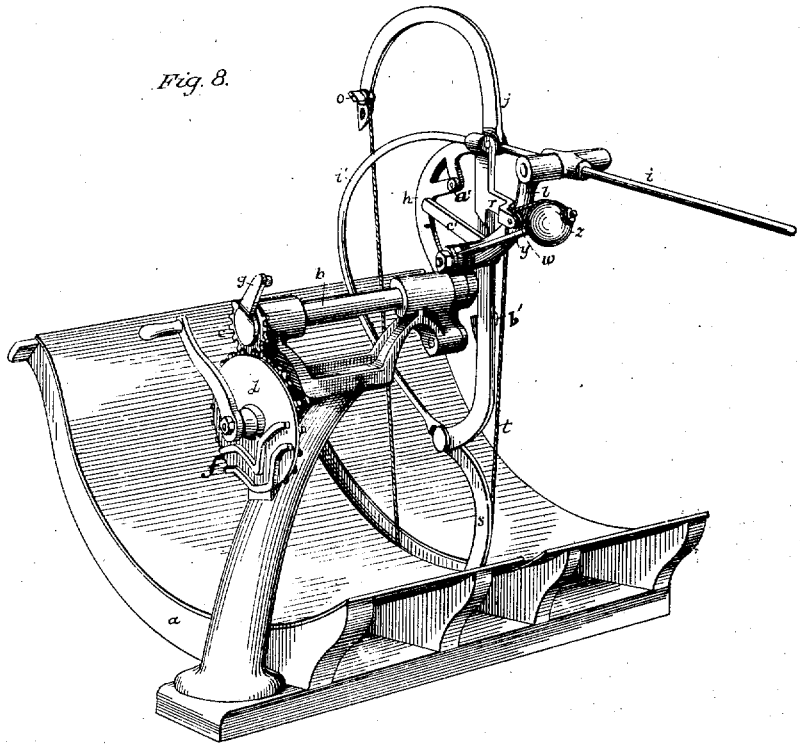

Figure 1 is a side view of the binding attachment, (as to the whole harvester a front view,) with the binder parts in the position of rest. Fig. 2 is a side view of the binding attachment, (as to the whole harvester a rear view,) with the binder parts in the position of rest. Fig. 3 is a view from the same point of observation as in Fig. 1, with the primary grasper (a term hereinafter explained) at its first rest after commencing the binding of a bundle of grain. Fig. 4 is a view of the same as Fig. 3, except that the primary grasper has retreated to its second rest from the position shown in Fig. 3. Fig. 5 is a view from the same point of observation as in Fig. 4, but the parts have advanced to the point where the binding of the bundle is finished and said bundle is discharged upon the ground. Fig. 6 is a rear view of the binding attachment, (as to the whole harvester a side view,) with the binder parts in the same position as in Fig. 1. Fig. 7 is a view on the plane *x x*, Fig. 6, looking in the direction indicated by the overlying arrow, showing the operating-gear, pinion, grooved cam, and cam-arm. Fig. 8 is a perspective view of my machine.

The subject-matter of my invention is an improvement in means for gathering bundles of grain, for compressing and carrying the bands around the same, and for discharging the bound bundles.

The device which in this machine carries the band has imparted to it a movement controlled from two separate points, and is an irregular rotation—in effect a cam motion—as distinguished from a crank-motion around a single point. When, therefore, in this specification the term "circulatory movement" is employed it is to be understood to imply that species of rotation which has two foci or points of control in contradistinction to that species of rotation which is known as circular and has but one focus-point of control.

My invention consists, first, of a grain-gathering arm having actuating mechanism near its middle imparting a circulatory movement to its free end, with an adjustable pivoted guide-block supporting said gatherer near its other end, the whole operating in a plane crosswise of the shaft; second, of a grain separating or gathering arm having actuating mechanism near its middle imparting to its free end a circulatory movement, with mechanism for supporting and guiding the other end, adjustable as to the distance of said supporting mechanism from the actuating mechanism, the combination operating to enable the operator to enlarge or diminish the range of movement of the free end of the gatherer to conform to the amount or to the condition of the grain or the requirements of the work; third, of a grain-gathering arm whose free end has a circulatory motion and a reciprocating gatherer working in conjunction and from an opposite direction to gather the bundle, as set forth, with suitable mechanism to cause the reciprocating gatherer to retreat and liberate the bundle, as set forth; fourth, an automatic binder of a grain-gatherer whose free end has a circulatory movement and an independently-pivoted reciprocating gatherer working in conjunction and from an opposite direction to gather the bundle, as set forth; fifth, of a grain-gatherer whose free end has a circulatory movement and a reciprocating gatherer working in conjunction, but in opposite direction thereto, combined with a compress rope or band subtending said arms, the combination operating to round and to compress the gathered bundle, as set forth; sixth, of two counter-moving coworking gatherers, combined with a subtending compress rope or band and an adjustable weight, the combination operating to compress the bundle with an adjustable force; seventh, of the combination, in an automatic binder, of a band-carrier whose free end has a circulatory movement with a reciprocating grasper working in conjunction and from opposite directions to gather the bundle and place a band around the same; eighth, of a band-carrier and a counter-moving coworking grasper, combined with a subtending compress rope or band and an adjustable weight, the combination operating to compress the bundle with an adjustable force and to place a band around the bundle so compressed; ninth, of the combination of a gear and pinion, either or both of which may be segmental, with a revolving cam and cam-arm, so that the pinion and gear control the movements of the operated shaft for a part of the time of rotation, and the cam and cam-arm the other part of the time; tenth, of the peculiar construction of the grasper-arm *r*, provided with a fender; eleventh, in a binder-arm mounted upon a crank, and provided with a heel-extension and pivoted guide for the same substantially vertical to the crank-shaft and in the plane of rotation with the wrist-pin; twelfth, in a binder-arm which has a circulatory motion imparted to it, and a mechanism which arrests said arm during the time when the band is being secured, and then causes it to resume its forward movement to discharge the bundle; thirteenth, in a binding-arm which has a circulatory motion imparted to it, and a mechanism which arrests said arm during the time when the band is being secured, then causes it to retrograde, and then to resume its forward movement to discharge the bundle; fourteenth, in a binder-arm which has a circulatory motion imparted to it, a mechanism and a compressor coacting therewith, and mechanism which causes said arm and compressor to move toward each other to compress the bundle and arrest the same while the band is being secured, and then causes said arm to resume its forward movement and the compressor to move in the same direction at a greater speed, so as to liberate and discharge the bundle, and any such other and further details as I hereinafter set forth.

The grain is delivered upon the receiver *a* by an endless apron, and in a manner and by means which form no part of my present invention.

The letter *b* denotes the main rotary shaft of the binding attachment, bearing at one end the pinion *c*, meshed into and driven by the gear *d*, which is driven by the chain-belt *e*, actuated from another rotary shaft of the machine. The rotation of shaft *b* is not wholly given by the pinion *c* and gear *d*, but partially thereby, and for the remaining part by the grooved cam *f*, which is on the same shaft with the gear *d*, and cam-arm *g*, which is fast on shaft *b*.

It will be seen that a portion of the teeth of gear *d* and pinion *c* is cut away, though the same effort is produced if but one of these be segmental, so as to disengage at the cut-away part, and the motions of shaft *b* are given in the interim by cam-arm *g* engaging with grooved cam *f*. On one end of shaft *b* is a rotating arm, *h*, to which is pivoted the primary grasper, composed of the bar *i*, bearing the hook *j*.

From the frame *k* rises the standard *l*, to which is pivoted the guide-block *m*, in which slides the bar *i*, and this guide-block may be adjusted up or down on this standard, as desired. To this guide-block is attached the twine-cup *n*, which holds a ball of cord wherewith to bind the bundles of grain. The twine runs out from this cup along the side of grasper-hook *j* in proper supports through the twine-needle *o* down to the knot-tying device, which will not be particularly described here.

On the standard *l* is pivoted the secondary grasper, composed of bar *r* and hook *s*. The rope *t*, starting from the point of the primary grasper, runs around a pulley, *u*, on the point of the secondary grasper, thence around the pulleys *v w* to the swinging arm *y*, on which is a sliding weight, *z*, to adjust the tension of rope *t*, and consequently the tightness with which the bundles of grain shall be bound.

The operation of these parts is as follows: The parts being in the position shown in Fig. 1 the grain comes falling down on the receiver against the rope. At the right time the primary grasper, actuated through the pinion *c*, moves down to the position shown in Fig. 4, throwing the rope and the cord around the bundle of grain. The graspers remain in the position shown in Fig. 3 till the knot-tying device has tied a single knot. At this point the gear *d* and pinion *c* are disengaged from each other, and the cam *f* and arm *g* have engaged. After proper rest in position shown in Fig. 3, and under the action of cam *f* and arm *g*, the primary grasper retreats to position shown in Fig. 4, where it remains long enough to permit the knot-tying device to tie the second knot and sever the twine. Now, at first under the action of cam *f* and arm *g*, but afterward under the action of gear *d* and pinion *c*, the parts move to position shown in Fig. 5, which discharges the bound bundle of grain upon the ground. Still continuing under the action of gear *d* and pinion *c* the parts move on to position shown in Fig. 1, which is the point where this description of the operation of the parts commenced.

When the parts move from the position shown in Fig. 4 to that shown in Fig. 5 the pin *a'* on the side of arm *h* strikes the shoulder *b'* on the secondary grasper, and raises this grasper till the bundle is discharged, when it trips off the end of the shoulder and lets this grasper fall. This same pin immediately afterward strikes arm *c'*, which is on the same shaft with weighted arm *y*, raising it, and finally trips off the end of arm *c'* and lets arm *y* fall to effect tension of rope.

It will be observed that gear *d*, pinion *c*, grooved cam *f*, and cam-arm *g* are so arranged, shaped, and timed to each other that the primary grasper is first moved forward to a point where it rests a determined time, then retreats, then rests, and then goes forward to the position from which it started, the gear *d* and grooved cam *f* revolving constantly meanwhile.

Now, I believe that the combination of a gear and pinion, either or both of which may be segmental, with a revolving cam and cam-arm, so that the pinion and gear control the movement of the operated shaft for a part of the time, and the cam and cam-arm for the other part of the time, of rotation, is broadly new.

The letter *i'* denotes a fender attached to the secondary grasper, to shield the working parts from the grain. It is fastened at one end to the hook *s*, which is pivoted on arm *r*, and the other end of the fender runs through the socket *j'*, or has a slot therein, through which a set-screw or bolt passes into the arm *r*, or other equivalent or suitable means for adjustment, and by sliding this fender through this socket or equivalent, as just described, the position of hook *s* with reference to arm *r* may be adjusted and regulated.

Having described my invention, what I claim as new is—

1. A grain separating and gathering arm having at its free end a circulatory movement, combined with actuating mechanism near its middle and an adjustable guide-block near its outer end, whereby the range of movement may be enlarged or diminished.

2. A band-carrier having at its free end a circulatory movement, combined with a guide-block adjustable as to distance between said guide and the actuating mechanism.

3. A grain-gathering arm whose free end has a circulatory movement and an independently-pivoted reciprocating gatherer working in conjunction and from an opposite direction, combined with mechanism to cause said reciprocating gatherer to retreat and liberate the bundle when bound.

4. Combined with a grain separating and gathering arm having at its outer end a circulatory movement, an independently-pivoted reciprocating gatherer working in conjunction with said arm and from opposite directions to gather the bundle.

5. A grain-gathering arm having at its free end a circulatory movement and an independently-pivoted reciprocating gatherer working in conjunction therewith and from an opposite direction, combined with a compress rope or strap subtending said arms to round and compress the bundle, as set forth.

6. A grain-gathering arm having at its free end a circulatory movement and a reciprocating gatherer working in conjunction therewith, combined with a compress rope or strap subtending said arms and an adjusting-weight to regulate the compress-tension.

7. A band-carrier whose free end has a circulatory movement, combined with an independently-pivoted reciprocating grasper working in conjunction therewith and from an opposite direction to compress the bundle and carry a band around it.

8. A band-carrier whose free end has a circulatory movement and an independently-pivoted reciprocating grasper working in conjunction and from an opposite direction, combined with a compress rope or strap subtending said grasper and carrier to round and compress the gathered bundle and place a band around the bundle so completed.

9. In combination, the pinion *e* and gear *d*, either or both segmental, the grooved cam *f*, and cam-arm *g*, when designed for operation substantially as shown and described.

10. In combination, the rotary arm *h*, bearing the pin *a'*, the pivoted graspers *i j* and *r s*, rope *t*, weighted arm *y*, with its shaft, and the arm *c'*, when arranged to operate substantially as shown and described.

11. In combination, the grasper-arm *r*, hook *s*, pivoted thereto, and fender *i'*, adjustable in the socket *j*, substantially as shown and described.

12. A driving-crank which carries a binder-arm having a heel-extension and a guide for the same, all in a plane vertical as to the band-securing mechanism, combined with a binding-table and a frame which reaches over said table to support said guide and a driving-shaft for said crank, as set forth.

13. The binder-arm having a circulatory motion at its point, in combination with actuating mechanism which arrests said movement when the point reaches the band-securing mechanism until the bundle is bound, and then causes it to move forward again to eject the sheaf from the receptacle.

14. A binder-arm having a circulatory movement at its point, combined with mechanism which automatically actuates it, to wit: to arrest its forward movement when the point reaches the band-securing mechanism, then causing it to retrograde a short distance, and again to move forward to discharge the bound bundle.

15. A binder-arm having a circulatory movement at its point, in combination with a compressor-arm and mechanism which actuates the two, to meet and compress the gavel, arrest them while the band is being secured, recede from each other to liberate the bundle, and move together forward to discharge the same.

16. The combination, with a binder-arm mounted upon a rotating crank and having a heel-extension guided to determine its path, of a driving-gear and pinion, the latter of which is locked and positively held in position by the former during a portion of its rotation to hold the point of the binder-arm stationary when it reaches the band-securing mechanism.

In testimony whereof I have set my hand to the specification of these reissued Letters Patent this 15th day of February, A. D. 1878.

EMMET HORTON.

Witnesses:
ROBT. F. GAYLORD,
S. D. LOCKE.